United States Patent [19]
Kimura et al.

[11] Patent Number: 5,873,128
[45] Date of Patent: Feb. 16, 1999

[54] DATA PROCESSING SYSTEM WITH DYNAMIC ADDRESS TRANSLATION FUNCTION

[75] Inventors: Takemi Kimura; Masahiro Hatta; Yoshifumi Ogi, all of Kawasaki, Japan

[73] Assignee: Fujitsu Limited, Kanagawa, Japan

[21] Appl. No.: 890,345

[22] Filed: Jul. 9, 1997

Related U.S. Application Data

[63] Continuation of Ser. No. 214,285, Mar. 17, 1994, abandoned.

[30] Foreign Application Priority Data

Jun. 28, 1993 [JP] Japan .................................. 5-156923

[51] Int. Cl.$^6$ .................................................. G06F 12/00
[52] U.S. Cl. .......................................... 711/206; 711/209
[58] Field of Search ...................................... 711/206, 209

[56] References Cited

U.S. PATENT DOCUMENTS

| 5,023,773 | 6/1991 | Baum et al. | 395/727 |
| 5,127,094 | 6/1992 | Bono | 711/2 |

FOREIGN PATENT DOCUMENTS

| 50-076950 | 6/1975 | Japan . |
| 54-52929 | 4/1979 | Japan . |
| 1-228039 | 9/1989 | Japan . |

*Primary Examiner*—Jack A. Lane
*Attorney, Agent, or Firm*—Staas & Halsey

[57] ABSTRACT

A data processing system has a dynamic address translation function for dynamically translating virtual addresses into real addresses and processes data. The system employs a plurality of control registers for managing the developed addresses of address translation tables and a selector for selecting one of the control registers. The control register selected by the selector specifies one of the address translation tables, which is used to dynamically translate a virtual address into a real address.

16 Claims, 8 Drawing Sheets

DATA PROCESSING SYSTEM WITH DYNAMIC ADDRESS TRANSLATION FUNCTION

This application is a continuation of application No. 08/214,285, filed Mar. 17, 1994, now abandoned.

BACKGROUND OF THE INVENTION

1. Field of the Invention

The present invention relates to a data processing system with a dynamic address translation function for translating a virtual address into a real address and for processing data, and particularly, to a data processing system with a dynamic address translation function that secures data from destruction.

As the number of users of computer systems and the importance to society of computers increases, protecting computer systems and user data is becoming more important.

2. Description of the Related Art

A computer system with a channel unit having a conventional dynamic address translation function to control input/output units will be explained.

The computer system provides users with virtual data spaces, respectively. If it provides each user with a real address, the user may access an area in a main memory of the system. Then, there will be a risk of the user unknowingly destroying data in a system area or data in other user areas in the memory. To avoid the risk, the users are provided with the respective virtual spaces and are allowed to access the main memory only through the virtual spaces.

When transferring data between the main memory and the input/output units, the channel unit translates a virtual address related to the data into a real address by the use of a single control register. The register holds an address that specifies a segment table, which is used to translate the virtual address into the real address.

This prior art uses the control register to translate virtual addresses related to not only a channel program but also user data into real addresses. Namely, a user space where the user data are developed is not independent of a system space where the channel program is developed, and therefore, each user can access the channel program in the system space, to sometimes destroy data in the system space without knowing it.

SUMMARY OF THE INVENTION

An object of the present invention is to provide a data processing system with a novel dynamic address translation function for translating virtual addresses into real addresses while securing data from destruction.

In order to accomplish the object, a data processing system with a dynamic address translation function according to the present invention employs a plurality of control registers for managing the developed addresses of address translation tables used for translating virtual addresses into real addresses, and a selector for selecting one of the control registers. The selected control register holds an address that specifies an address translation table, which is used to translate a virtual address into a real address.

BRIEF DESCRIPTION OF THE DRAWINGS

The present invention will be more clearly understood from the description as set forth below with reference to the accompanying drawings wherein.

DESCRIPTION OF THE PREFERRED EMBODIMENTS

Figure 1:
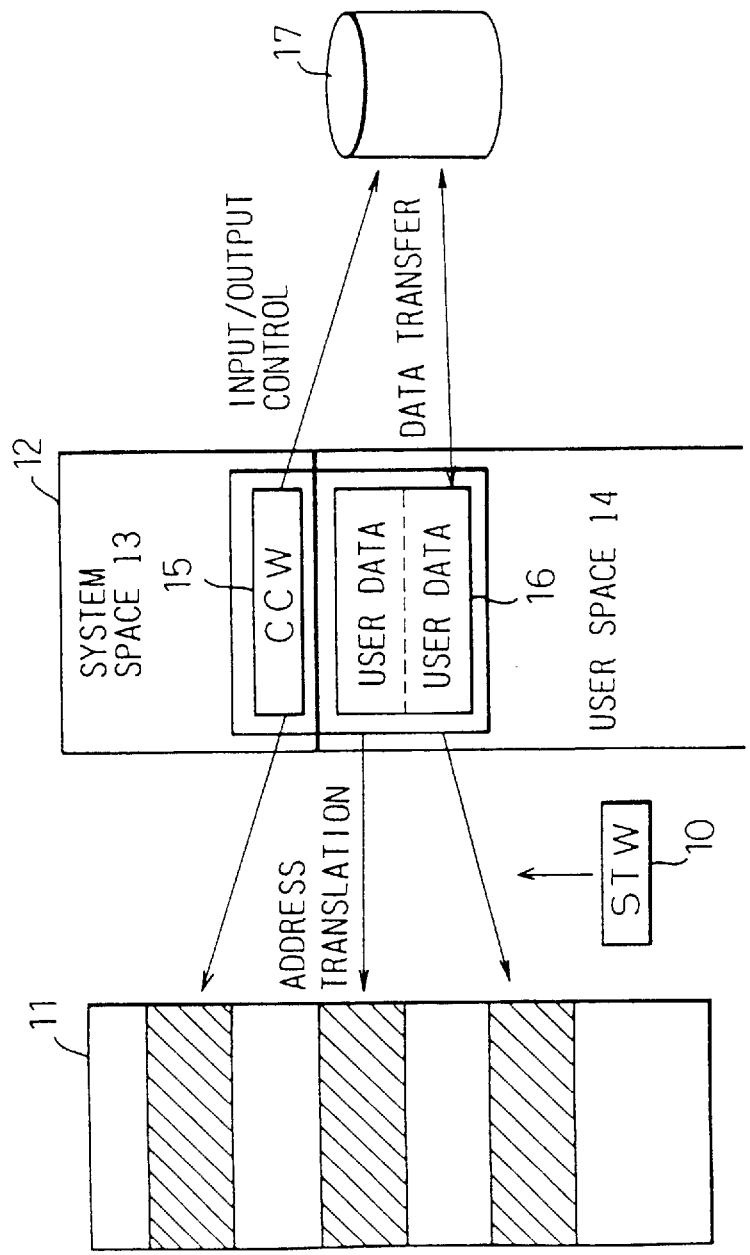
FIG. 1 shows a data processing system with a dynamic address translation function according to the related art.

Before describing the preferred embodiments according to the present invention, the related art, as shown in FIG. 1 is discussed.

A control register 10 manages the developed address of a segment table. The segment table is used to translate a virtual address into a real address. The related art of FIG. 1 also involves a real memory area 11, a virtual memory area 12, a system space 13 in the virtual memory area 12, a user space 14 in the virtual memory area 12, a channel program 15 developed in the system space 13, user data 16 developed in the user space 14, and an input/output unit 17.

According to this arrangement, the same control register 10 is used to convert not only virtual addresses related to the channel program 15 into real addresses but also virtual addresses related to the user data 16 into real addresses. Accordingly, the user space 14 where the user data are developed is not independent of the system space 13 where the channel program 15 is developed. This allows a user to access the channel program 15 in the system space 13, and to unknowingly destroy the data in the system space 13.

Figure 2:
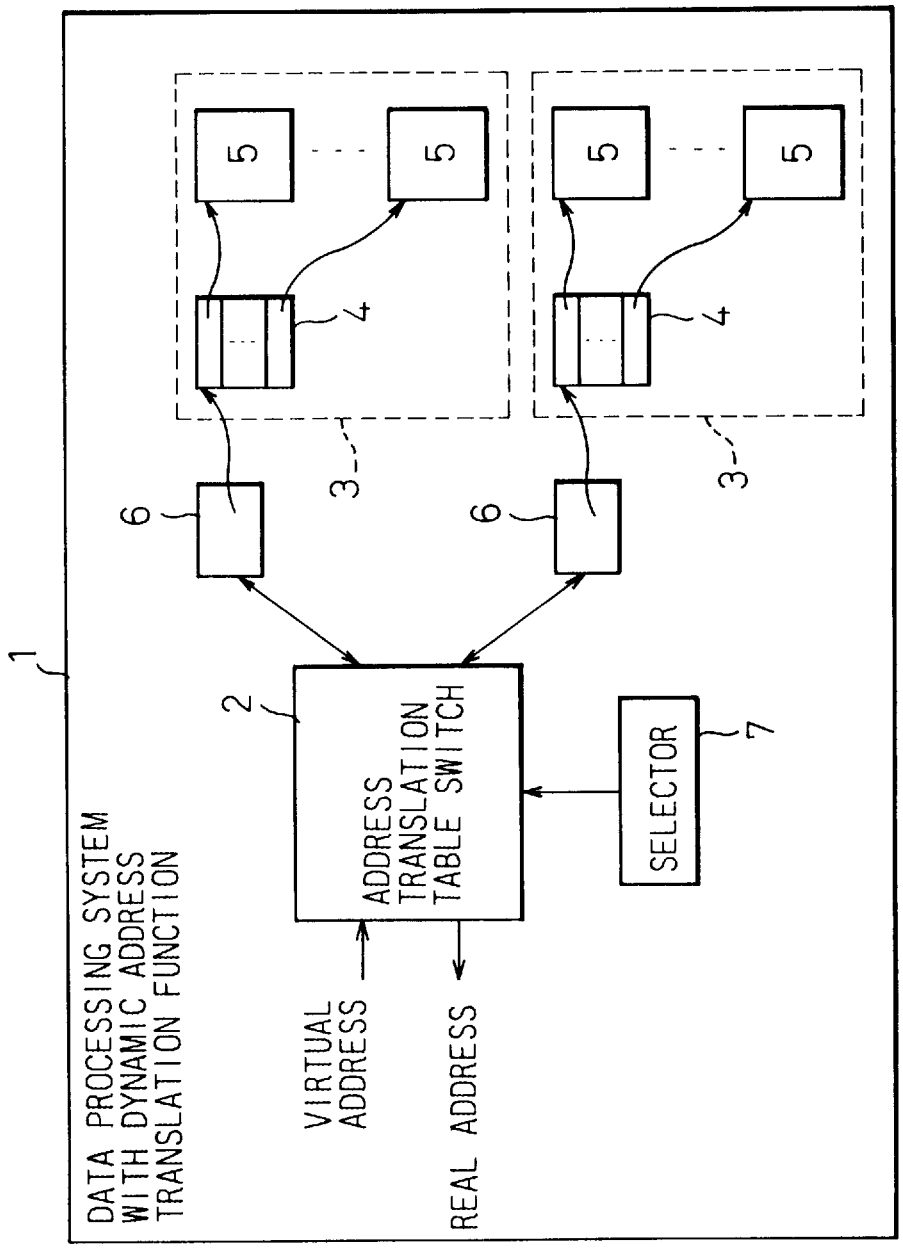
FIG. 2 shows a principle of a data processing system with a dynamic address translation function according to the present invention.

FIG. 2 shows a principle of the present invention.

A data processing system 1 according to the present invention has a dynamic address translation function. The system 1 has an address translation table switch 2. With this switch 2, the system 1 converts virtual addresses into real addresses and processes data.

The system 1 has address translation tables 3 each composed of a segment table 4 and page tables 5. The system 1 also has a plurality of control registers 6 for managing the developed addresses of the segment tables 4 that control the developed addresses of the address translation tables 3. The system 1 further has a selector 7 for controlling the switch 2 to select one of the control registers 6.

The control registers 6 of the system 1 are separately assigned for a system space and a user data space.

The selector 7 selects one of the control registers 6 through the switch 2. The selected register specifies one of the segment tables 4, which specifies one of the page tables 5 to translate a virtual address into a real address.

In this way, the present invention arranges a plurality of the control registers 6 for controlling the developed addresses of the address translation tables 3, respectively, to thereby handle the system space independently of the user data space. This results in preventing a user from unknowingly accessing the system space or other user areas and damaging the data in them.

Figure 3:
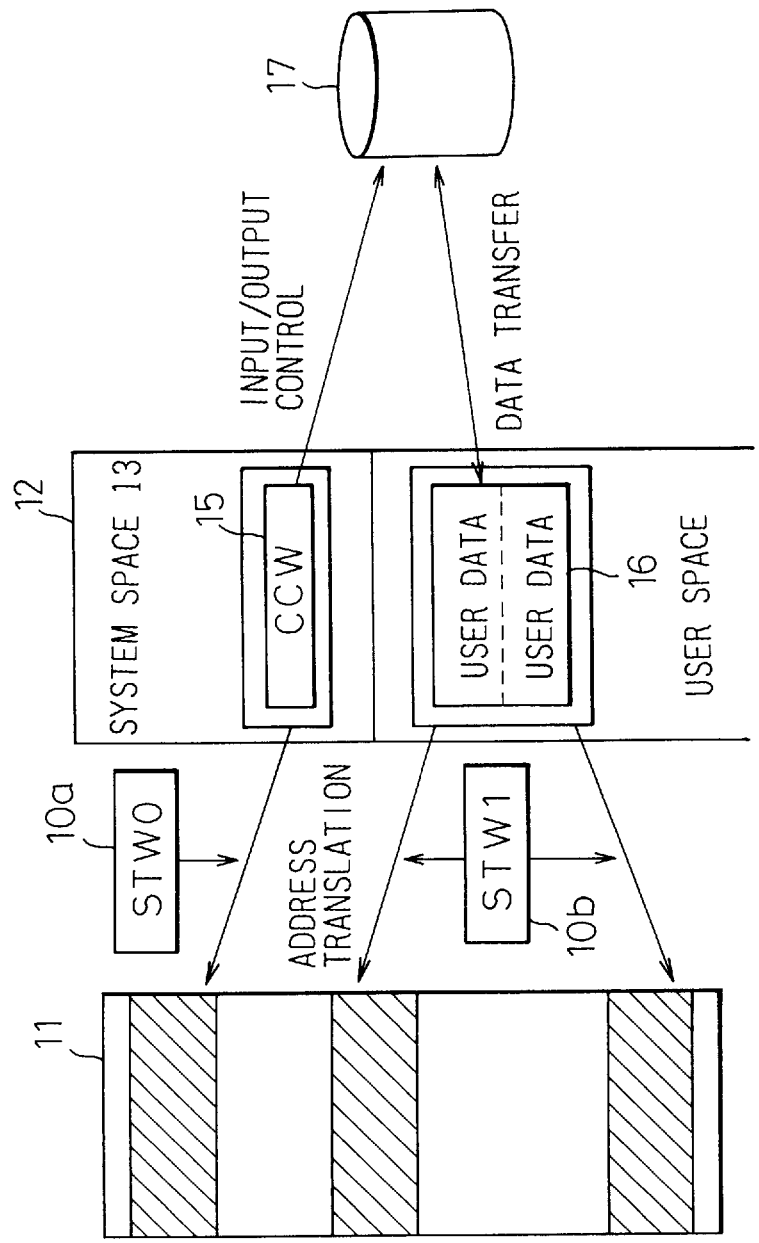
FIG. 3 shows a data processing system with a dynamic address translation function according to an embodiment of the present invention.

FIG. 3 shows a data processing system having a channel unit according to the present invention. When transferring data between main memory and an input/output unit, the channel unit translates a virtual address into a real address. In FIG. 3, the same parts as those of FIG. 1 are represented with like numerals.

A control register 10a is used to translate virtual addresses related to a channel program 15 developed in a system space 13 into real addresses. A control register 10b is used to translate virtual addresses related to user data 16 developed in a user space 14 into real addresses. In the figure, the control register 10a is represented as STW0 and the control register 10b as STW1.

Unlike the prior art of FIG. 1, the dynamic address transfer (DAT) function according to the present invention employs two control registers for managing the developed addresses of segment tables. Namely, the control register 10a is for the channel program 15 and the control register 10b for the user data 16. According to the prior art, the control register 10a is used for the channel program as well as for the user data. The present invention, however, newly employs the control register 10b for address translation of the user data 16.

Figure 4:
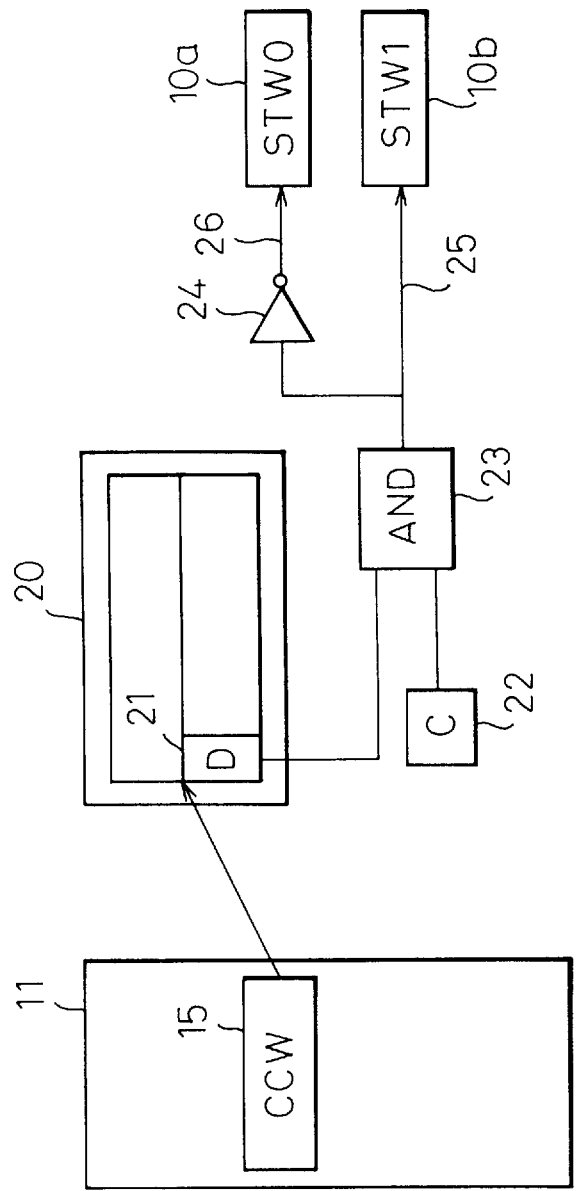
FIG. 4 shows elements for selecting and enabling an address translation table according to the present invention.

FIG. 4 shows a process of selecting one of the control registers 10a and 10b.

The channel program 15 is a series of channel commands that are developed in the real memory area 11. A channel command read out of the real memory area 11 is temporarily stored in a buffer 20. The read channel command describes an input/output control process. For example, the channel command instructs the reading of a given quantity of the user data 16 starting from a given virtual address and providing the data to the input/output unit 17.

The channel command includes a control bit 21 that specifies one of the control registers used for translating a virtual address contained in the channel command into a real address. The control bit 21 will be "1" to specify the control register 10b and "0" to specify the control register 10a.

An enable/disable bit 22 enables or disables the control bit 21. The bit 22 will be "1" to enable the control bit 21 and "0" to disable the control bit 21.

An AND circuit 23 provides "1" when the control bit 21 is "1" and the enable/disable bit 22 is "1," and in other cases, "0." When the AND circuit 23 provides "1," the control register 10b is activated through a signal line 25.

An inverter 24 inverts the output of the AND circuit 23. When the inverter 24 provides "1," the control register 10a is activated through a signal line 26.

The bits 21 and 22 correspond to the selector 7 of FIG. 2, and the AND circuit 23 and inverter 24 correspond to the address translation table switch 2 of FIG. 2.

Figure 5:
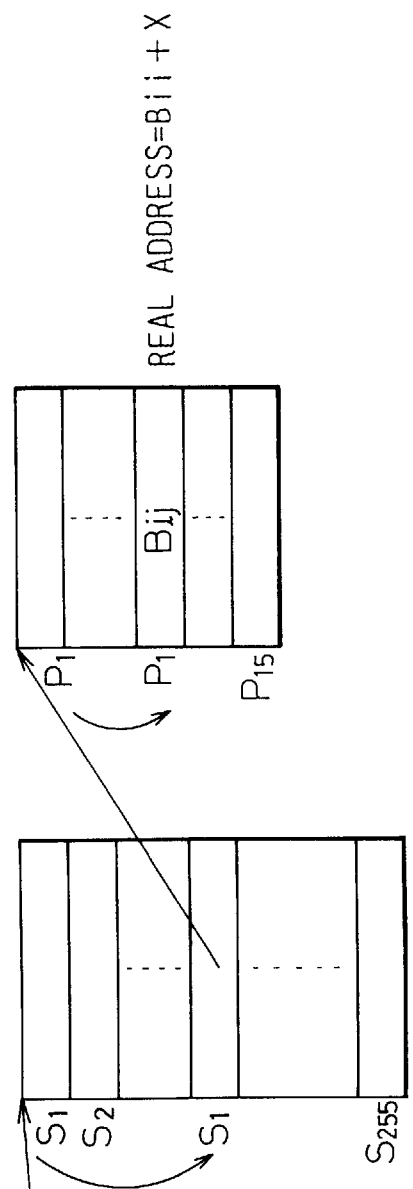
FIG. 5 shows a control register and address translation tables used to translate a virtual address into a real address.

FIG. 5 explains translation of a virtual address into a real address through a control register (STW) and address translation tables. The virtual address contains a segment number Si, a page number Pj, and an in-page displacement X. The control register indicates the start address of a segment table, and in the segment table, the segment number Si specifies a segment. The segment indicates the start address of a page table, and in the page table, the page number Pj specifies a page. The page indicates the start address Bij of the page, so that a real address is obtained by adding the displacement X to the address Bij.

Figure 6:
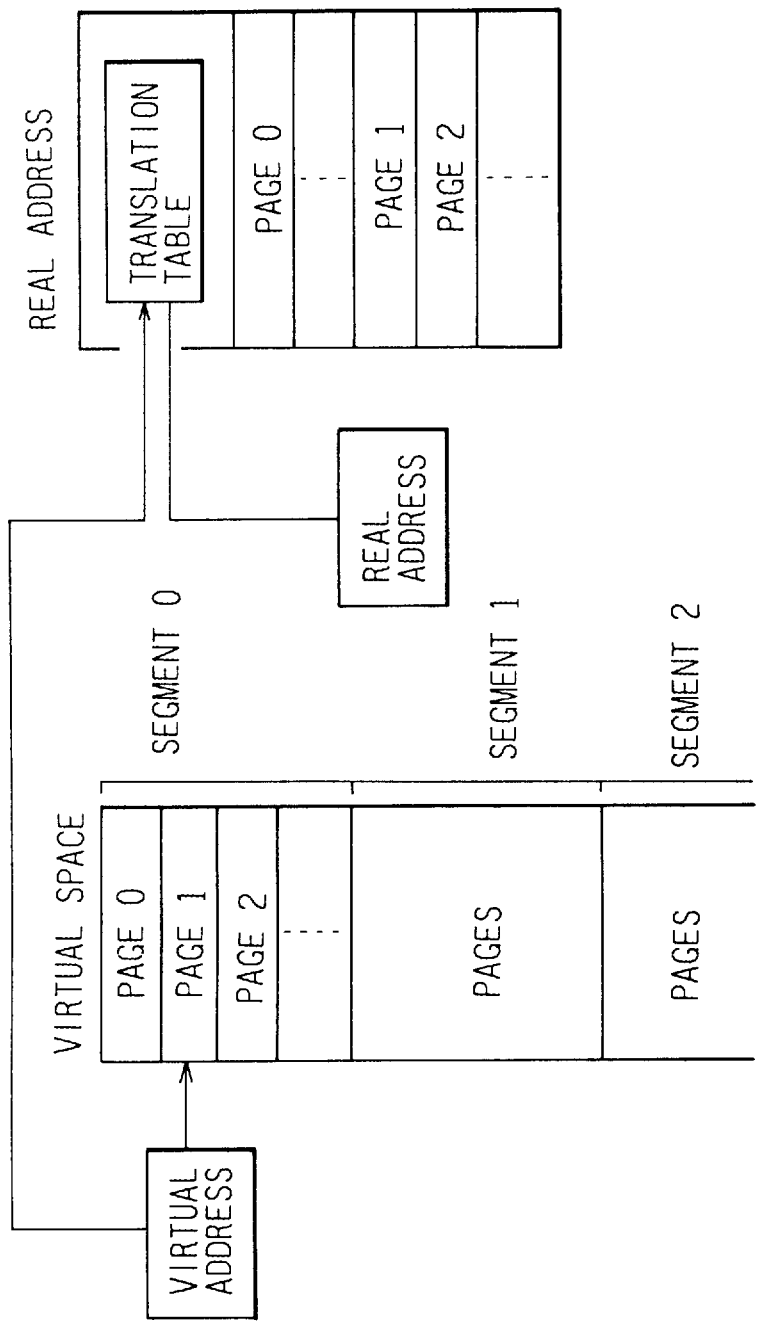
FIG. 6 shows a relationship between a virtual address and a real address.

FIG. 6 explains a relationship between a virtual address and a real address.

Figure 7:
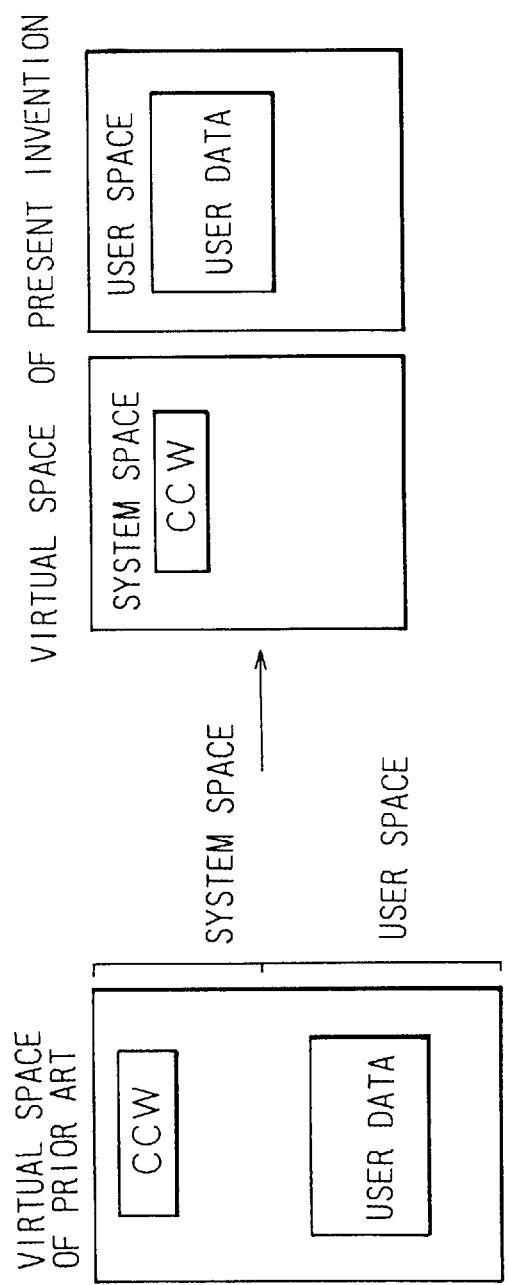
FIG. 7 shows a comparison between the related art and the present invention that accesses a system space (CCW) and a user space (user data) with different control registers and translation tables.

FIG. 7 shows a comparison between the prior art and the present invention. The prior art on the left side of the figure provides a virtual space that contains a system space and a user space together. The present invention on the right side of the figure provides a system space (a channel code word) and a user space (user data) that are independent of each other and are accessed through different control registers and translation tables.

Figure 8:
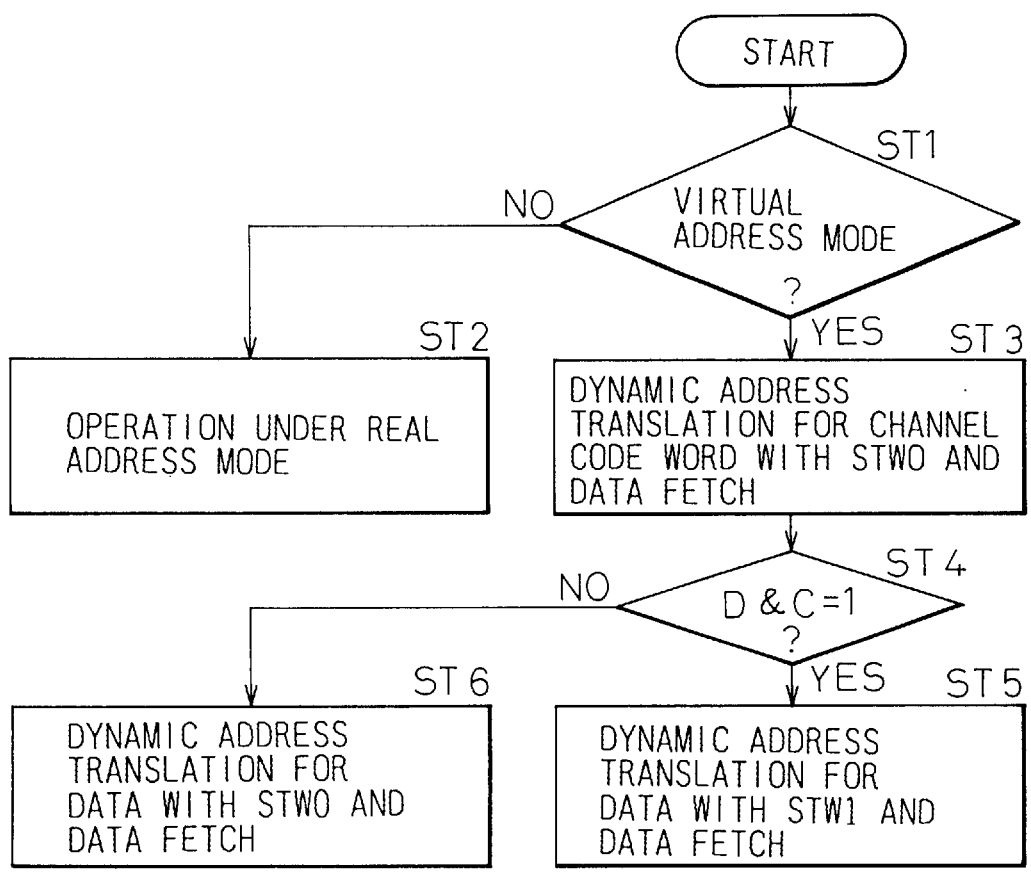
FIG. 8 shows address translation steps according to the present invention.

FIG. 8 is a flowchart showing address translation steps according to the present invention.

Step 1 determines whether it is a virtual address mode or a real address mode. If it is the real address mode, step 2 executes an operation under the real address mode.

If it is the virtual address mode, step 3 selects the control register 10a, which specifies segment and page tables for translating a virtual address related to the channel program 15 into a real address. According to this real address, a channel command is fetched and stored in the buffer 20.

Step 4 determines according to the AND circuit 23 whether a control bit 21 contained in the channel command stored in the buffer 20 is "1" and the enable/disable bit 22 is also "1." If YES, step 5 translates a virtual address described by the channel command into a real address according to segment and page tables specified by the control register 10b, and a portion of the user data 16 developed at the real address is transferred to the input/output unit 17.

If step 4 provides NO, step 6 translates the virtual address described by the channel command into a real address according to segment and page tables specified by the control register 10a, and a portion of the user data 16 developed at the real address is transferred to the input/output unit 17.

In this way, this embodiment employs two control registers for managing the developed addresses of channel dynamic address translation tables for the channel program 15 and user data 16, respectively. According to the embodiment, each channel command has a bit for determining whether or not the control register 10b for the user data 16 is used. At the same time, the embodiment employs the enable/disable bit 22 for enabling or disabling the determination. When a channel command specifies the control register 10b for the user data 16 and the bit 22 enables the specified register 10b, an address translation table specified by the control register 10b is used to dynamically translate a virtual address described in the channel command into a real address. When the channel command does not specify the control register 10b for the user data 16, an address translation table specified by the control register 10a for the channel program 15 is used to dynamically translate the virtual address into a real address, similar to the prior art. When the bit 22 disables the specified register, the address translation table specified by the control register 10a for the channel program 15 is used to dynamically translate the virtual address described in the channel command into a real address.

In this way, the present invention maintains compatibility with the prior art while independently handling the system space 13 where the channel program 15 is developed and the user space 14 where the user data 16 are developed.

As explained above, the present invention provides a data processing system with a dynamic address translation function for translating virtual addresses into real addresses and processing data. This system employs a plurality of control registers for managing the developed addresses of address translation tables that are used to dynamically translate virtual addresses into real addresses. Namely, the system according to the present invention handles a system space independently of user data spaces. This results in preventing users from unknowingly damaging data in the system space or the data spaces of other users.

We claim:

1. A channel unit, within a data processing system having a dynamic address translation function for dynamically translating virtual addresses into real addresses, comprising:

a plurality of control registers to manage developed addresses of address translation tables used for translating logical addresses to real addresses for a plurality of logical address spaces in the channel unit, one of the control registers being used to specify an address translation table for a system space and another of the control registers being used to specify an address translation table of a user data space, the system space having at least one command for controlling the channel unit, to prevent use of the system space in the channel unit by a user of the user data space in the channel unit;

selection means for selecting one of the control registers; and address translation table switching means for activating the selected control register;

the selected and activated control register specifying one of the address translation tables to dynamically translate a virtual address in the corresponding logical address space in the channel unit into a real address.

2. The system according to claim 1, wherein one of the control registers specifies one of the address translation tables that serves the system space in the channel unit.

3. The system according to claim 1, wherein one of the control registers specifies one of the address translation tables that serves the user data space in the channel unit.

4. The system according to claim 1, wherein the selection means employs a predetermined bit contained in a command provided by the system as a selecting one of the control registers.

5. The system according to claim 4, wherein the selection means employs a flag for enabling/disabling the selection flag.

6. The system according to claim 4, wherein the address translation table switching means activates the control register selected by the selection flag.

7. The system according to claim 5, wherein the address translation table switching means calculates an AND of the selection flag and enable/disable flag, to activate the selected and enabled control register.

8. The system according to claim 1, wherein the system is a channel unit for controlling input/output units.

9. A data processing system with a dynamic address translation function for dynamically translating virtual addresses into real addresses and processing data in a channel unit, comprising:

a plurality of control registers for managing developed addresses of address translation tables used for translating logical addresses to real addresses for a plurality of logical address spaces in the channel unit, one of the control registers being used to specify an address translation table for a system space in the channel unit, and another of the control registers being used to specify an address translation table for a user data space in the channel unit, said plurality of control registers preventing use of the system space by a user of the user data space, the system space having at least one command for controlling the channel unit;

selection means for selecting one of the control registers, employing a predetermined bit contained in a command provided by the system as a flag for selecting one of the control registers and a bit for enabling/disabling the selection flag; and address translation table switching means for calculating the AND of the selection flag and enable/disable flag, to activate one of the control registers that has been selected and enabled, the selected and enabled control register specifying an address translation table to dynamically translate a virtual address in the corresponding logical address space in the channel unit into a real address.

10. The system according to claim 9, wherein the system is a channel unit for controlling input/output units.

11. A method of dynamically translating virtual addresses into real addresses and processing data in a channel unit to prevent use of a system space in the channel unit by a user of a user data space in the channel unit, the system space having at least one command for controlling the channel unit, comprising:

determining whether it is a virtual address mode or a real address mode;

processing data under the real address mode, if it is determined to be the real address mode;

translating a virtual address into a real address according to segment and page tables specified by a control register prepared for translating addresses related to a predetermined program, fetching a command developed at a real address, and storing the command in a buffer, if it is determined to be the virtual address mode; and translating a virtual address into a real address according to segment and page tables specified by a control register selected according to a selection flag contained in the command, and transferring data developed at the real address to a given unit according to the command.

12. The method according to claim 11, wherein the step of selecting a control register according to the selection flag contained in the command further includes a step of calculating the AND of the selection flag and a flag for enabling/disabling the selection flag, and selecting a control register according to a result of the AND operation.

13. The method according to claim 12, wherein, when the AND is false, the virtual address is translated into a real address according to segment and page tables specified by the control register prepared for translating addresses related to the predetermined program, and user data developed at the real address are fetched and transferred to the given unit.

14. The method according to claim 11, wherein the predetermined program is a channel program of a channel unit for controlling input/output units, the command is a channel command contained in the channel program, and the given unit is one of the input/output units.

15. A data processing system with a dynamic address translation function for dynamically translating virtual addresses into real addresses and processing data in a channel unit and for preventing use of a system space in the channel unit by a user of a user data space in the channel unit, the system space having at least one command for controlling the channel unit, comprising:

a plurality of control registers to manage developed addresses of address translation tables used for translating logical addresses to real addresses for the system and user data spaces in the channel unit;

a selection device to select one of the control registers; and an address translation table switching device to activate the selected control register;

the selected and activated control register specifying one of the address translation tables to dynamically translate a virtual address in a corresponding system space or user data space in the channel unit into a real address.

16. A dynamic translator in a computer system having a main memory with a real memory space mapped into a plurality of virtual memory spaces, an external storage, and at least one processor executing a channel program composed of a sequence of channel commands moving data between one of said virtual memory spaces and said external storage, said dynamic translator comprising:

a first address translation table creating a virtual user memory space;

a user control register managing said first address translation table;

a second address translation table creating a virtual system memory space;

a system control register managing said second address translation table; and a selector reading a control section in each channel command and based on the control section selecting one of said system control register and said user control register to translate a virtual address in the channel command, thereby constraining the channel command when operating on user data to exclusively access the virtual user memory space and to prevent accessing the virtual system memory space.

* * * * *

UNITED STATES PATENT AND TRADEMARK OFFICE
CERTIFICATE OF CORRECTION

PATENT NO.: 5,873,128
DATED : February 16, 1999
INVENTOR(S): Takemi KIMURA et al.

It is certified that error appears in the above-identified patent and that said Letters Patent is hereby corrected as shown below:

On the title page, [73] Assignee, change "Kanagawa" to --Kawasaki--.

Signed and Sealed this

Twenty-ninth Day of June, 1999

Attest:

Attesting Officer

Q. TODD DICKINSON

Acting Commissioner of Patents and Trademarks